US009460355B2

(12) United States Patent
Stenneth et al.

(10) Patent No.: US 9,460,355 B2
(45) Date of Patent: Oct. 4, 2016

(54) LATERAL SIGN PLACEMENT DETERMINATION

(71) Applicant: HERE Global B.V., Veldhoven (NL)

(72) Inventors: Leon Stenneth, Chicago, IL (US); Leo Modica, Sawyer, MI (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/513,956

(22) Filed: Oct. 14, 2014

(65) Prior Publication Data

US 2016/0104049 A1    Apr. 14, 2016

(51) Int. Cl.
*G06K 9/00* (2006.01)
*G06K 9/62* (2006.01)

(52) U.S. Cl.
CPC ......... *G06K 9/00818* (2013.01); *G06K 9/6262* (2013.01)

(58) Field of Classification Search
CPC .. G06K 9/00818; G06K 9/6262; G06K 9/66; G06K 9/6255; G06K 9/4628; G06N 99/005; H04N 7/0145
USPC ....... 382/155, 103, 104, 156, 159, 165, 291, 382/224, 190; 700/48, 51; 706/20
See application file for complete search history.

(56) References Cited

U.S. PATENT DOCUMENTS

| | | | |
|---|---|---|---|
| 6,813,545 B2 * | 11/2004 | Stromme | ........................ 701/1 |
| 7,433,889 B1 | 10/2008 | Barton | |
| 7,466,841 B2 * | 12/2008 | Bahlmann et al. | ........... 382/103 |
| 8,050,456 B2 * | 11/2011 | Nakamori et al. | ............ 382/103 |
| 8,064,643 B2 * | 11/2011 | Stein et al. | .................... 382/104 |
| 8,643,721 B2 | 2/2014 | Becker | |
| 2009/0171581 A1 * | 7/2009 | Ushida et al. | ................ 701/211 |
| 2013/0049988 A1 | 2/2013 | Roeber et al. | |
| 2014/0320317 A1 * | 10/2014 | Grauer et al. | ................ 340/907 |

FOREIGN PATENT DOCUMENTS

WO    WO2013084225    6/2013

OTHER PUBLICATIONS

Liu et al., A System for Road Sign Detection, Recognition and Tracking Based on Multi-Cues Hybrid, Jun. 3-5, 2009, pp. 562-567, Northeastern University.

* cited by examiner

*Primary Examiner* — Sheela C Chawan
(74) *Attorney, Agent, or Firm* — Lempia Summerfield Katz LLC

(57) ABSTRACT

Systems, methods, and apparatuses are described for predicting the placement of road signs. A device receives data depicting road signs from multiple vehicles. The device analyzes a detected placement of the road signs and at least one characteristic of a collection of the data. The characteristic describes the road upon which the data was collected, an operation of the vehicle from which the data was collected, or an environment in which the data was collected. The device generates a model that associates values for the detected placement of the road signs with values for the at least one characteristic. The model may be later accessed to interpret subsequent sets of data describing one or more road signs.

18 Claims, 12 Drawing Sheets

LATERAL SIGN PLACEMENT DETERMINATION

FIELD

The following disclosure relates to lateral sign placement determination, or more particularly, systems and algorithms for machine learning on road networks and vehicle sensor data for real time lateral sign placement determination.

BACKGROUND

Nearly all roadways are posted with physical speed limit signs. The speed limits may be set according to a wide variety of rules and by different entities. Countries or states may set speed limits for interstates or major highways, and municipalities such as cities and towns may set speed limits for smaller roads and streets. The speed limits may be selected under rules based on the curvature or lane width of the road. The speed limits may be selected under rules based on the proximity to urban or rural areas. Other considerations such as school zones, bridges, or pedestrian crossings may impact the selection of speed limits. Because of these variable situations, it is not possible to reliably identify the speed limit of a road from the placement of the road or shape of the road on the map. Instead, posted speed limits are detected in order to identify speed limits of roads on the map. Other indicia or road postings may be similarly inconsistent.

The speed limits or other indicia may be posted using a variety of techniques. Some speed limits may be posted on a sign driven into the ground adjacent to the road. Other speed limits may be posted on overhead signs. Some speed limits may be constant values painted on the signs. Other speed limits may be variable and displayed electronically. The locations and types of speed limit signs are not consistent among groups of roads or even along the same road. Challenges remain in detecting speed limit values or other sign indicia reliably.

SUMMARY

Systems, methods, and apparatuses are described for predicting the placement of road signs. A device receives data depicting road signs from multiple vehicles. The device analyzes a detected placement of the road signs and at least one characteristic of a collection of the data. The characteristic describes the road upon which the data was collected, an operation of the vehicle from which the data was collected, or an environment in which the data was collected. The device generates a model that associates values for the detected placement of the road signs with values for the at least one characteristic. The model may be later accessed to interpret subsequent sets of data describing one or more road signs.

BRIEF DESCRIPTION OF THE DRAWINGS

Exemplary embodiments are described herein with reference to the following drawings.

DETAILED DESCRIPTION

Figure 1:
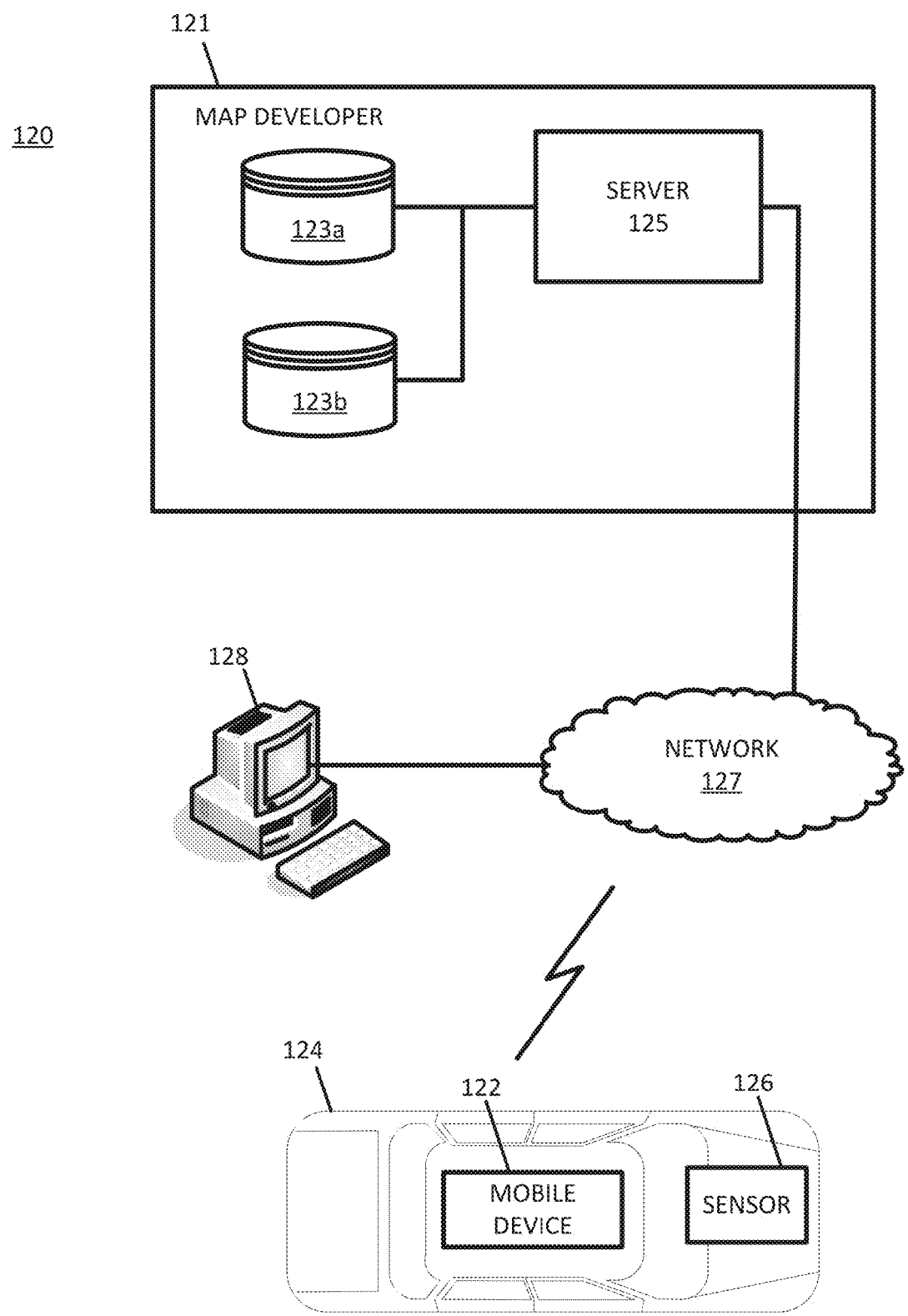
FIG. 1 illustrates an example system for determining lateral sign placement.

Road signs may be placed in various locations. A road sign may be defined as a physical object conveying information to those traveling on or near a road. Signs may be posted on existing posts or utility poles, individually mounted on poles adjacent to the road, mounted on walls or other building alongside the road, mounted on overpasses, or supported by overhead gantries. On individual roads, signs may be placed in different locations from one posting to the next. In addition, signs may be moved in certain situations. Signs may be moved because construction necessitates. Signs may be moved to new locations for convenience when the signs are replaced. Because the location of signs are variable, detection, either by camera or another type of sensor, is difficult.

In addition, the cameras or other sensors on a vehicle traveling on one road link may be able to detect signs intended for another road link. For example, consider a highway with a parallel access road that runs alongside the highway. Signs for the access road may be detected by a vehicle traveling on the highway, and signs for the highway may be detected by a vehicle traveling on the access road. In another example, signs for a roadway may be detected from vehicles traveling on an overpass, or signs for the overpass may be detected from vehicles traveling on the lower roadway. Similarly, signs from a ramp may be detected from a main roadway, and vice versa.

The following embodiments provide systems and methods for predicting where a road sign is placed laterally around the road (e.g., left, right, or above). The term lateral placement may be defined as a position with respect to the road or vehicle. Data is collected over a selection of one or more roadways and by one or more multiple vehicles equipped with cameras or other sensors to detect the signs. A model is developed based on at least one characteristic under which the data was collected. The model may be considered a historical learned model because it is based on data collected over time. An example characteristic may describe the type of the road or the shape of the road where the data was collected. Another example characteristic may describe the speed, orientation or other operation of the vehicle when the data was collected. Another example characteristic may describe weather, time of day, or another condition external to the collection of the data. The historic learned model is consulted to evaluate real time observations as inputs, which may be coming from the vehicle (e.g.

vehicle sensor information) or from the environment (e.g. weather related sensors), and the output is the lateral placement.

From the model, subsequent detection of road signs is simplified. After the model has been developed, a vehicle may collect image data from a camera, or another type of data from another type of sensor. In one example, the data is analyzed to determine a possible lateral location of a sign and the model may be applied to confirm or deny the possible lateral location for sign placement. In another example, the data is analyzed to determine a possible lateral location of a sign and the model may be applied to confirm or deny whether that sign placement more likely corresponds to a current link or more likely corresponds to an adjacent link.

FIG. 1 illustrates an example system 120 for determining sign placements from data collected by one or more vehicles 124. The system 120 includes a developer system 121, one or more mobile devices 122, a workstation 128, and a network 127. Additional, different, or fewer components may be provided. For example, many mobile devices 122 and/or workstations 128 connect with the network 127. The developer system 121 includes a server 125 and one or more databases. Database 123a may be a probe database that stores probe data or data collected from one or more vehicles 124, which may include both historical and real time data. Database 123b may be a geographic database including road links or segments.

The vehicle 124 may collect data to build the model for determining lateral sign placement or collect data that is applied to the model in order to determine sign placement. The vehicle may include a mobile device 122 configured for communication with the network 127 and with a sensor array 126. All or portions of the sensor array 126 may be incorporated with the mobile device 122. The sensor array 126 may include one or a combination of a camera, a light detection and ranging (LIDAR) device, a radar system, or any device capable of identifying sign placement.

Data collected from the sensor 126 may sent to the server 125 through the network 127 by the mobile device 122. The server 125 receives data describing at least one road sign. Multiple vehicles 124 may report similar data to the server 125. The data may be image data from a camera graphically describing the road signs, a point cloud from the LIDAR device graphically or numerically describing the road signs, or distance data or location data from a radar system.

The server 125, or in some embodiments the mobile device 122, is configured to analyze a placement of the road signs and one or more characteristics of a collection of the image data. The characteristic may be a vehicle characteristic such as speed, heading, acceleration, position, elevation, deceleration of the vehicle 124. The sensor array 126 or the mobile device 122 may include position and/or motion sensors for determining the vehicle characteristic. The characteristic may be an environment characteristic, and the sensor array 126 may include sensors for determining the weather or other conditions. The characteristic may be a road characteristic such as contextual type, functional class, curvature, slope, heading, or another property of the road link that the vehicle 124 is traveling on when the data describing one or more road signs is collected. The geographic database 123b may store characteristics of the roads or paths.

Based on the analysis, the server 125, or in some embodiments the mobile device 122, is configured to generate a model that associates values for the lateral placement of the road signs with values for the one or more characteristics. The model may be a statistical model (e.g., normal or other type of distribution) that describes the likely sign placement average position and a parameter such as standard deviation. The model may be a mathematical model such as a linear or higher order equation or relationship that defines the sign placement as function of one or more the characteristics described above. The model may be a machine learning model, developed by the server 125 or another computer, that defines the sign placement as function of one or more the characteristics described above. The machine learning model may include a Bayesian model, a neural network, a decision tree, a random forest, or another model for determining sign placement as a function of one or more of the characteristics.

After the model is generated, characteristics for the collection of subsequent data describing one or more road signs may be applied as inputs to the model, which outputs a predicted placement within the data describing the road sign (e.g., image including the roadway). The data describing one or more road signs may be analyzed using a computer vision technique (e.g., edge detection, feature extraction, feature vector classification, or others) taking into consideration the predicted placement. For example, the computer vision technique may be applied to the area around the predicted placement first. In another example, a road sign is first detected in the data using a computer vision technique and the predicted placement is used to verify the detected placement. For example, a road sign is detected above on a gantry. However, the current road link where the data was collected does not typically have gantries. Thus, the sign must be for an adjacent (incorrect) road link, and the server 125 may dismiss the detected placement of the sign with respect to the current road link. Thus, the model may not rely only on observations of a single vehicle. Instead, multiple observations from multiple vehicles may be considered. Additional embodiments and details are discussed below.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include selection of the possible sign placements or characteristics recorded when the data describing the sign placements is collected. The workstation 128 may include at least a memory, a processor, and a communication interface.

The computing resources may be divided between the server 125 and the mobile device 122. In some embodiments, the server 125 performs a majority of the processing for calculating the vehicle confidence value and the comparison with the confidence threshold. In other embodiments, the mobile device 122 or the workstation 128 performs a majority of the processing. In addition, the processing is divided substantially evenly between the server 125 and the mobile device 122 or workstation 128.

Figure 2:
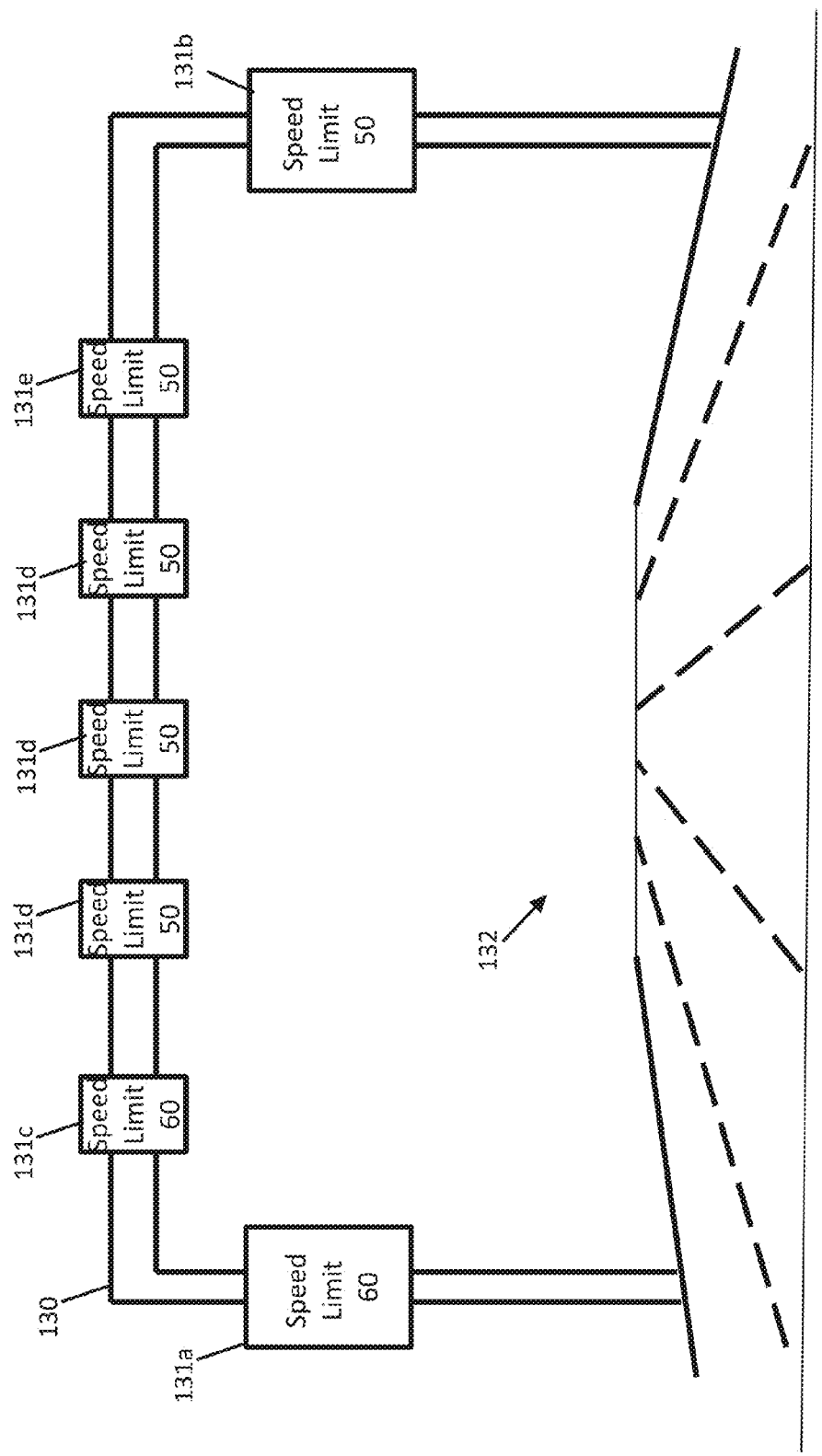
FIG. 2 illustrates an example roadway with a variety of sign placements.
Figure 3:
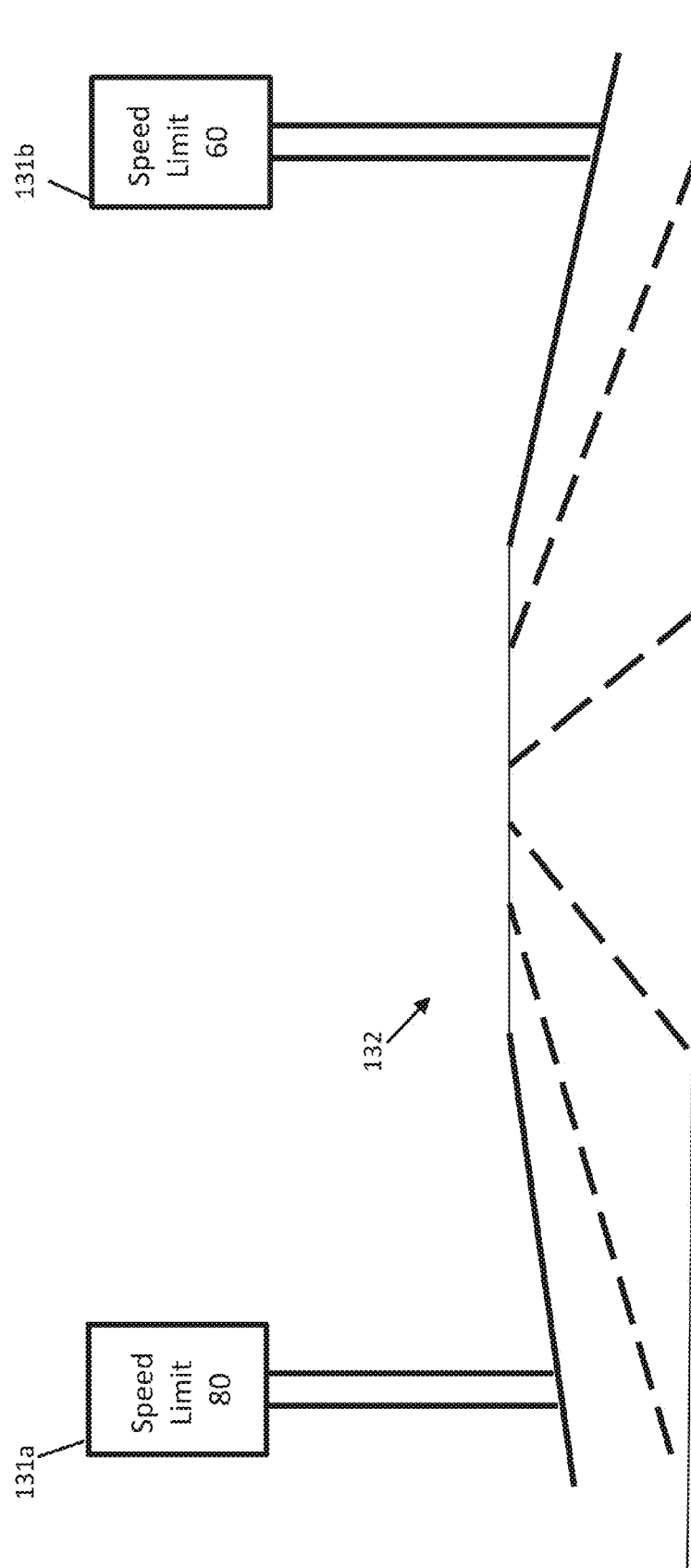
FIG. 3 illustrates another example roadway with adjacent sign placements.
Figure 4:
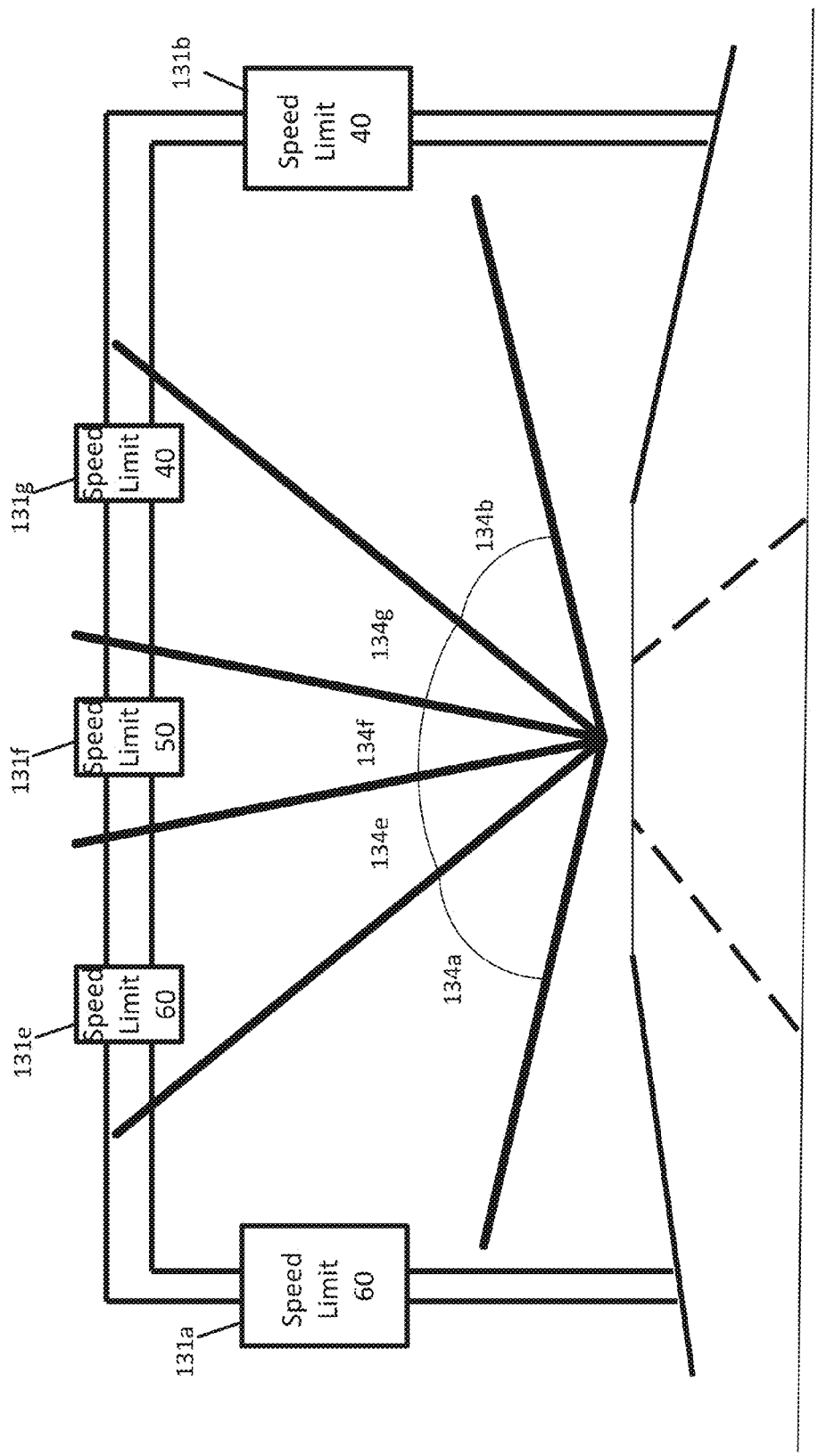
FIG. 4 illustrates another example roadway with sign placement ranges.

FIGS. 2, 3, and 4 illustrate example roadways with a variety of sign placements. The images of FIGS. 2, 3, and 4 may correspond to the image data describing one or more road signs as collected terrestrially by a camera on vehicle 124. The term terrestrial image may refer to those images taken from the ground or near the ground (i.e., not aerial images or satellite images). Alternatively, these embodiments may be applied to aerial images or satellite images. Rather than roadways, other types of path may be used such as pedestrian paths, bike paths, waterways, airways, train paths, moving walkways or other paths.

The units for the speed limit signs may be in kilometers per hour, miles per hour, meters per second, or other units. The signs are illustrated as speed limit signs but other types of signs are possible. The other types of signs may include curve warnings, road identification signs, navigational signs (e.g., distance to location A or turn here for location A), passing zones, yield signs, stop signs, bus stops, crosswalk signs, taxi stand, school zones, jail zones, high occupancy vehicle signs, express lane signs (e.g., directional or operation status), exit signs, parking signs, exclusionary signs, traffic signs, closure signs, toll signs, street or road identification signs, or another type of sign with alphanumeric and/or graphical indicia.

The signs in FIG. 2 are speed limit signs mounted on each sign of road 132 as well as on a gantry 130. In the example shown, a left side sign 131a indicates a speed limit of 60 for the left lane of the road 132, and a right side sign 131b indicates a speed limit of 50 for the right lane of the road 132. The right lane may be an exit lane, a truck lane, or a merge lane. The left most lane may be a high occupancy vehicle lane or an express lane. On the gantry, the left sign 131c may indicate a speed limit for the left lane, and the right sign 131e may indicate a speed limit for the right lane. The remaining middle signs 131d may correspond to the middle three lanes, respectively. The lanes may have individual speed limits or any combination of speed limits. The signs in FIG. 3 are speed limits signs mounted on the left and right sides of road 132 only.

FIG. 4 illustrates another example roadway with sign placement ranges. Any given sign posting may have one or any combination of a sign on the right side, a sign on the left side, signs on both sides, signs on a gantry, signs on a gantry and the left sign, signs on a gantry and the right side, and signs on a gantry and both sides. Various sign placements may correspond to angle ranges. For example, as shown in FIG. 4, angle 134a corresponds to sign placement 131a, angle 134e corresponds to sign placement 131e, angle 134f corresponds to sign placement 131f, angle 134g corresponds to sign placement 131g, and angle 134b corresponds to sign placement 131b.

The angle 134 may be assigned numerical ranges having a minimum value and a maximum value. Example ranges may include 10 to 45 degrees, 45 to 70 degrees, 70 to 110 degrees, 110 to 135 degrees, and 135 to 170 degrees. Any angle ranges are possible. The ranges may be defined using a technique other than numerical ranges. The signs placements may be classified as right, left, top, both sides, top and left, top and right, and top and both sides.

Figure 5:
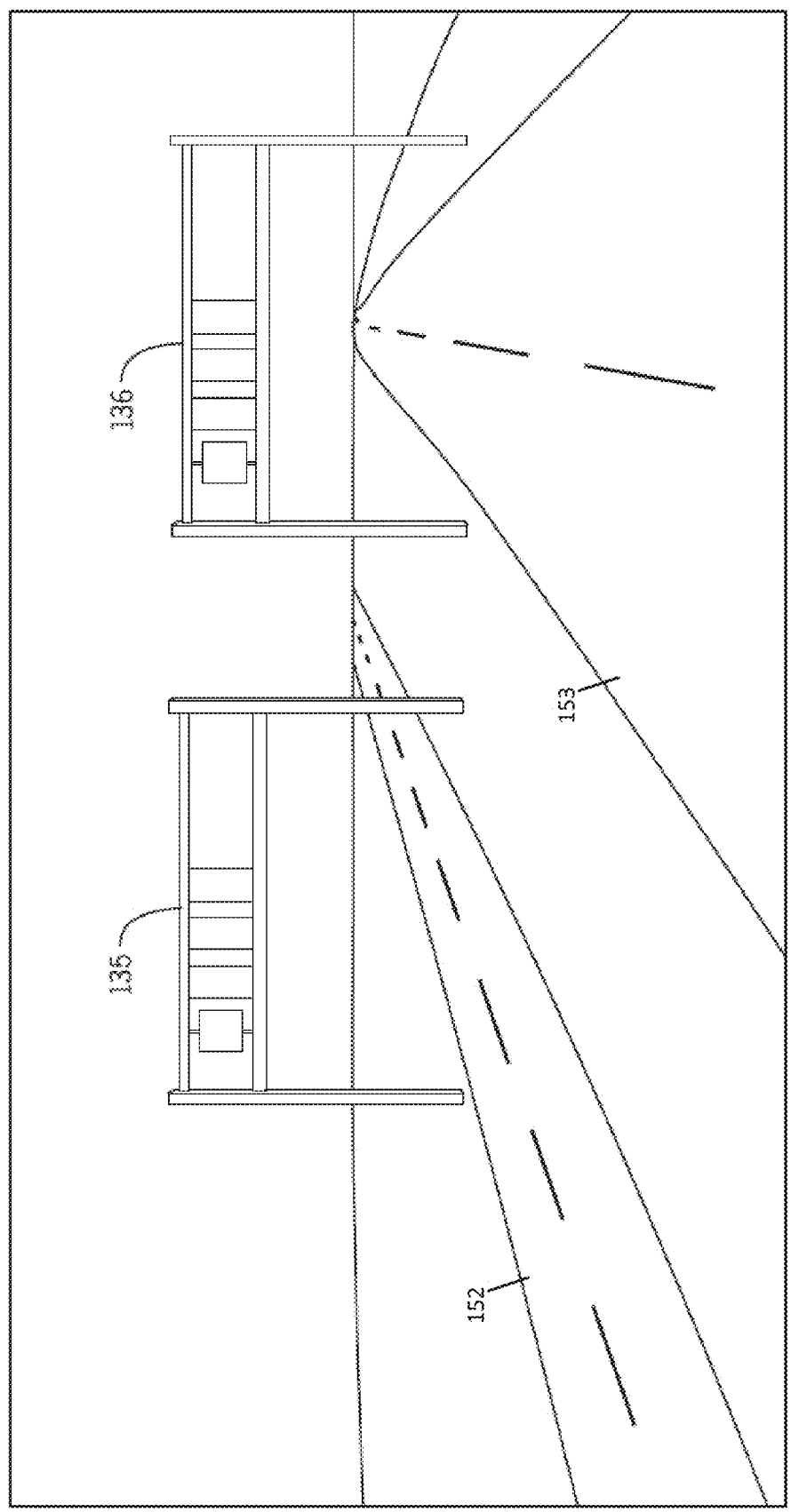
FIG. 5 illustrates an example set of parallel or adjacent roadways.
Figure 6:
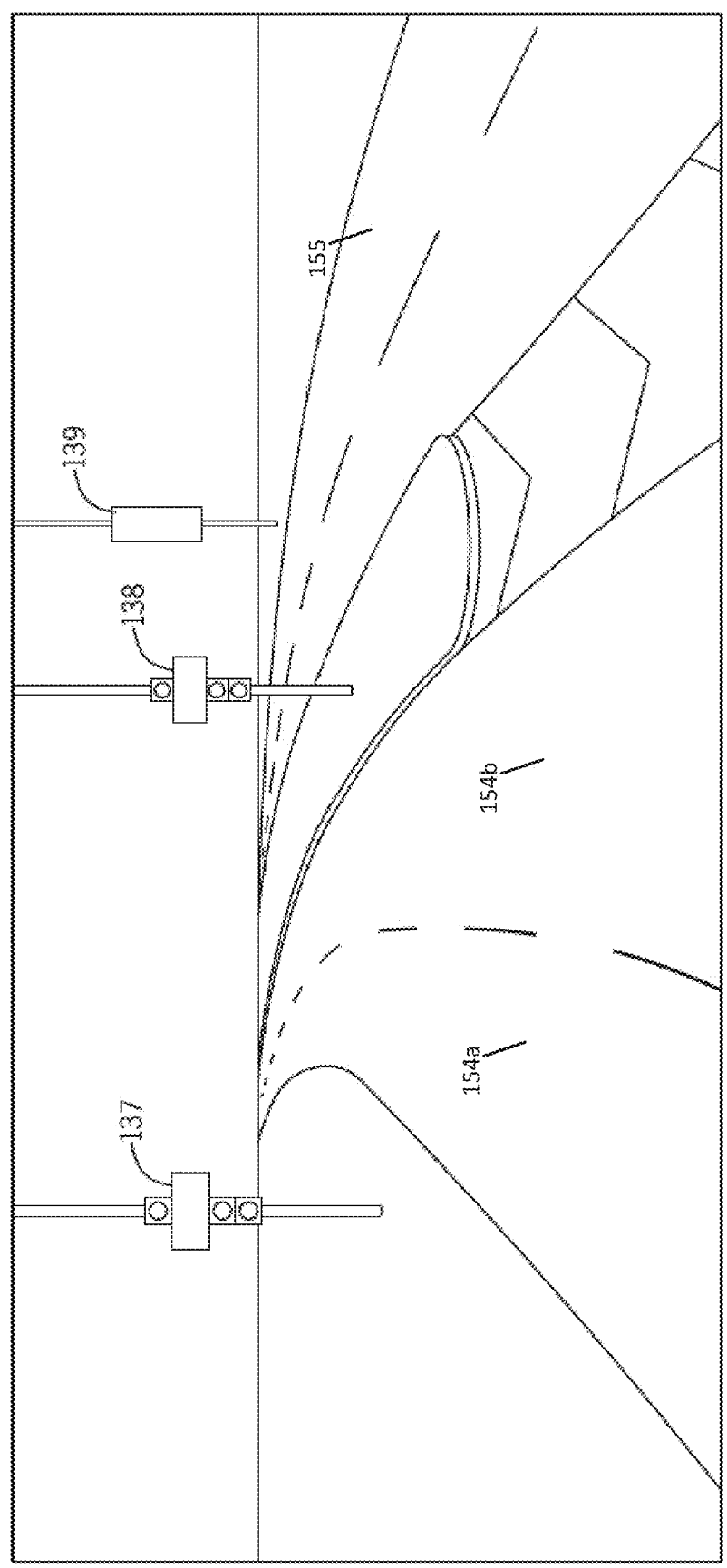
FIG. 6 illustrates another example set of parallel or adjacent roadways.
Figure 7:
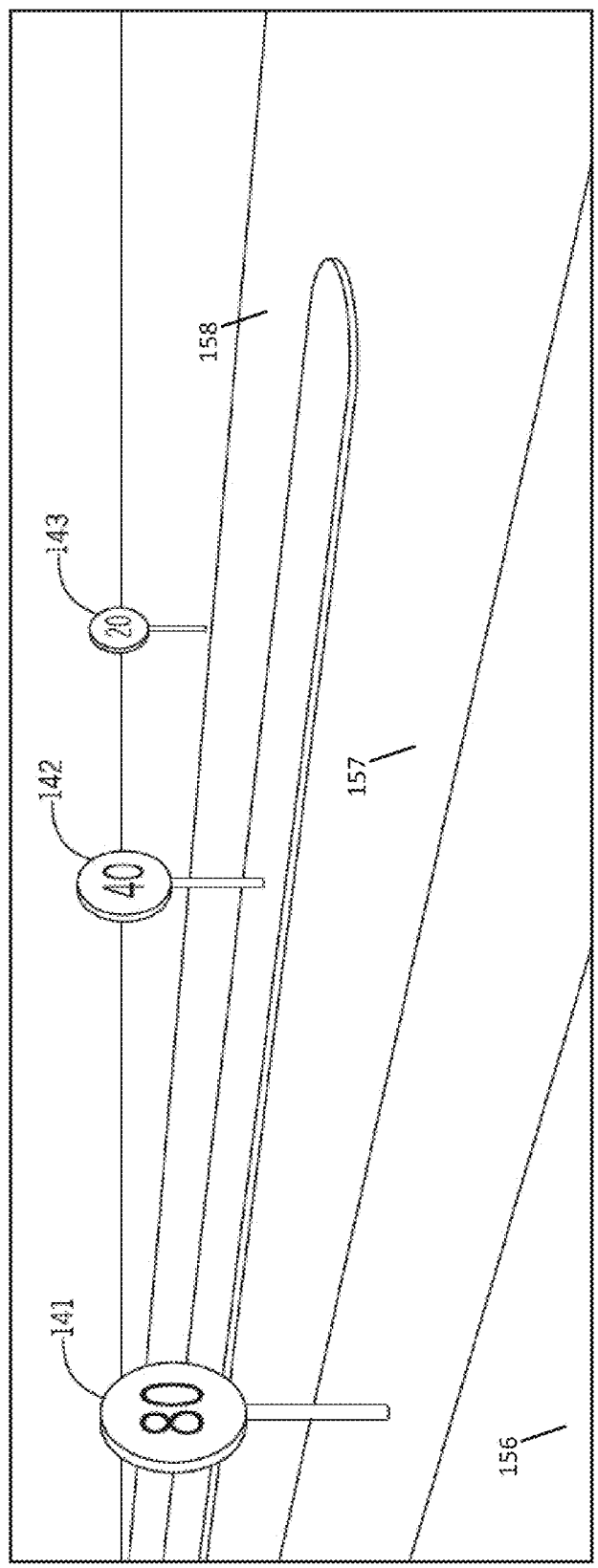
FIG. 7 illustrates another example set of parallel or adjacent roadways.

FIGS. 5, 6, and 7 illustrate sets of parallel or adjacent roadways. The example of FIG. 5 illustrates an example where multiple roads traveling in the same direction are adjacent and parallel. The term adjacent may be defined as within a distance range. The distance range may be within the detection capabilities of sensor 126. The distance range may be a function of the focal length of the camera. The distance range may be a function of the range of a LIDAR or radar device. The distance range may be configurable. Example distance ranges may be 10 meters, 100 feet or another value.

FIG. 5 illustrates that a vehicle traveling on left road 152 may be within viewing range or detection range of gantry sign 135 intended for left road 152 and also gantry sign 136 intended for right road 153. Likewise, a vehicle traveling on right road 153 may be within viewing range or detection range of gantry sign 136 intended for right road 153 and also gantry sign 135 intended for right road 152. The server 125 may identify that when data is collected from the left road 152, the likely sign placement is sign 135, and when data is collected from the right road, the likely sign placement is sign 136.

FIG. 6 illustrates that a vehicle traveling on left lane 154a may be within viewing range or detection range of sign 137 intended for the left lane 154b but also within range of sign 138 intended for right lane 154b and sign 139 intended for exit ramp 155. Similarly, a vehicle traveling on right lane 154b may mistakenly detect signs 137 and 139 intended for other vehicles, and a vehicle traveling on exit ramp 155 may mistakenly detect signs 137 and 138 intended for other vehicles. The server 125 may identify that when data is collected from left lane 154a, the likely sign placement is to the left, when data is collected from the right angel 154b, the likely sign placement is to the right, and when data is collected from exit ramp 155, the likely sign placement is to the right.

FIG. 7 illustrates another example where multiple signs may be detectable from a single point. Sign 141 should be associated with road link 156, sign 143 should be associated with road link 157, and sign 142 should be associated with road link 158. However, vehicles on road link 156 may detect be able to detect signs 142 and 143. The server 125 may analyze data collected from the road link 156 under the model to increases emphasis for the area of sign 141 and decrease emphasis for the areas of signs 142 and 143.

Figure 8:
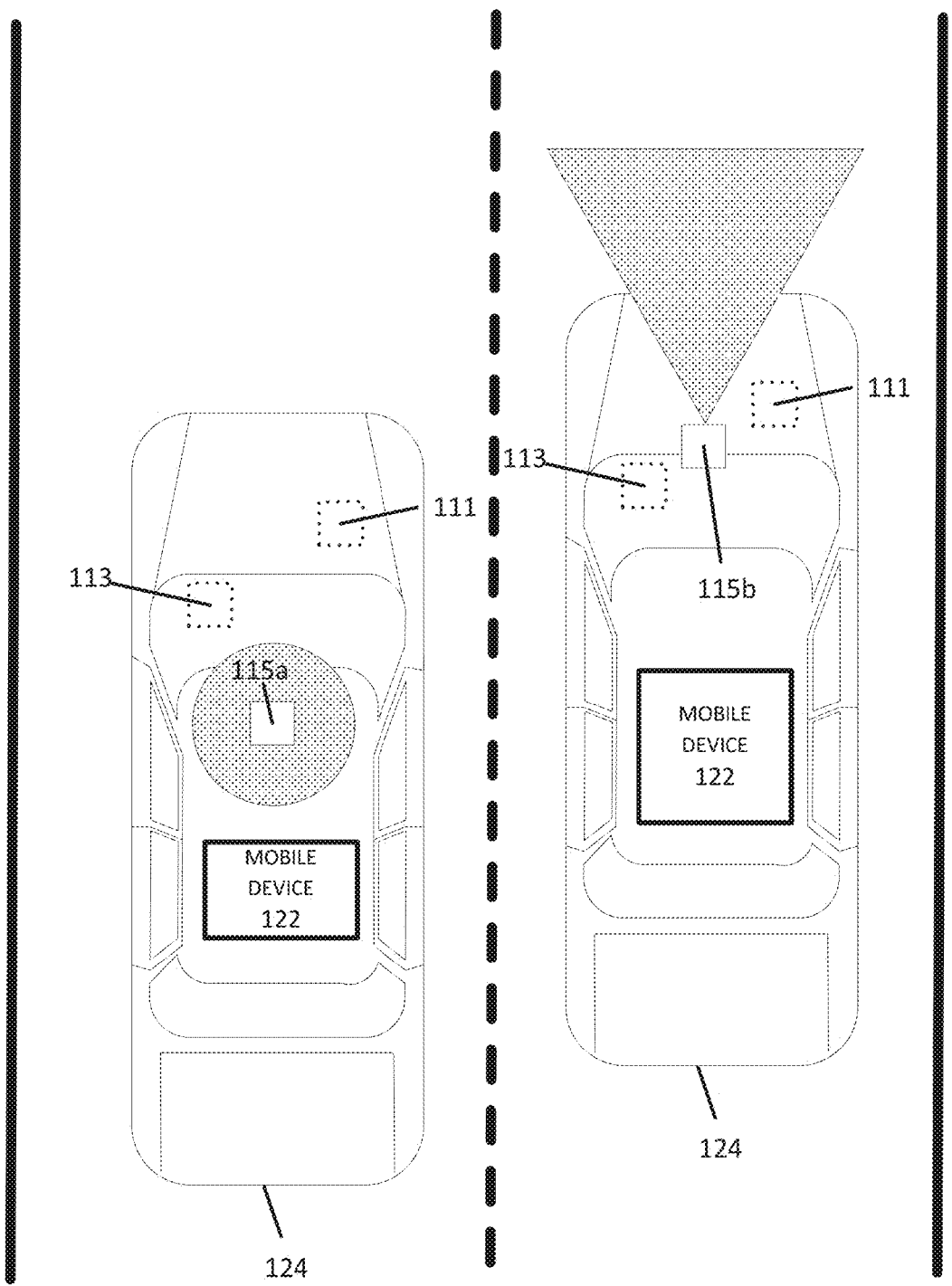
FIG. 8 illustrates an example set of vehicles for determining lateral sign placement.

FIG. 8 illustrates an example set of vehicles 124 for determining lateral sign placement. The vehicles 124 may be equipped with a mobile device 122 and a sensor array including one or a combination of a vehicle sensor 113, an environment sensor 111, and a camera 115. One example camera 115a is mounted on the top of the vehicle and has a 360 degree field of view, and another type of camera 115b is mounted on a front, rear, or side of the vehicle 124 and has a wide angle view less than a 360 field of view. The mobile device 122 may be a personal device such as a mobile phone equipped with position circuitry (e.g., global positioning system (GPS)) and an inertial measurement unit (IMU). The mobile device 122 may be a specialized device (e.g., not a mobile phone) mounted or otherwise associated with the vehicle 124 and similarly equipped with position circuitry and an IMU. Additional, different, or fewer components may be included.

The server 125 may construct the model for determining sign placement based on the input vectors and output vectors. Each pair ($\{X_1, Y_1,\}, \{X_2, Y_2,\}, \{X_3, Y_3,\}, \ldots \{X_n, Y_n,\}$) is a training example for training the model. A machine learning algorithm may seek a function $g: X \rightarrow Y$ where X is the input space and Y is the output space. G may be a scoring function $f: X*Y \rightarrow R$ such that g is defined as returning the y value that gives the highest score accordingly to Equation 1.

$$g(x) = \mathrm{argmax}_y f(x, y) \qquad \text{Eq. 1}$$

The camera 115 collects images or other data ("sign data") that describes one or more signs. The camera 115 may be a visible light spectrum image camera. The camera may be replaced with another type of optical sensor such as a light detection and ranging (LIDAR) sensor, or replaced with a radar sensor or an ultrasonic sensor. The sign placement may be organized in output vectors (e.g., sign placement labels $Y_i$).

For these training examples, the lateral sign placement is known. The sign placement may be determined by visual inspection of the images, visual inspection of the signs in person, computer vision, or from existing data previously recorded. The possible sign placement values for the output vectors for the output space Y may be assigned numerical values as shown in Table 1.

TABLE 1

| Label Value | Sign Placement |
|---|---|
| 1 | Right side |
| 2 | Left Side |
| 3 | Top |
| 4 | Both Sides |

The detected placements of a sign from multiple vehicles may be organized into a density distribution histogram consisting of a predetermined number (e.g., an integer value from 4 to 10 or another number) of bins which are possible lateral placements of the traffic sign as reported by the vehicle. Depending on the orientation of the vehicle to the sign, the same sign may appear at different lateral locations to different vehicle or the same vehicle at different times. The different locations recording by multiple vehicles, different instances of the same vehicle, or both are stored in the histograms. In one example, the bins may be [LEFT, MIDDLE_LEFT, MIDDLE_TOP, RIGHT, RIGHT_LEFT, RIGHT_MIDDLE, RIGHT_MIDDLE_LEFT]. The observations from several vehicles are used to populate the histogram.

The data from multiple vehicles in the histogram may be normalized. For each histogram, each bin frequency is represented as a fraction of the total number of observations represented in that histogram. Subsequently, the ratios between the bins are maintained, but the scale of their magnitudes is normalized. This avoids bias when comparing samples with different densities. After normalization, the sum of all bin frequencies for each histogram is 1.0. The highest bin is selected as the likely detected sign placement. Thus, using the order [LEFT, MIDDLE_LEFT, MIDDLE_TOP, RIGHT, RIGHT_LEFT, RIGHT_MIDDLE, RIGHT_MIDDLE_LEFT], a histogram having normalized values of [0.0, 0.25, 0.0, 0.5, 0.25, 0.0, 0.0] would be interpreted as a detected sign placement of RIGHT, and a histogram having normalized values of [0.33, 0.0, 0.66, 0.0, 0.0, 0.0, 0.0] would be interpreted as a detected sign placement of MIDDLE_TOP.

As individually defined below, the input space of input vectors are made up of one or any combination of vehicle data, position data, motion data, map data, and environment data (e.g., feature vectors $X_i$). The vectors may be sampled or divided in time slices or geographic samples. For example, at each distance or time interval, data is collected to make up a feature vector. Thus, a set of the vectors describe a period of time corresponding to a distance the vehicle 124 traveled as data was collected. Each vector may include the vehicle data, position data, motion data, and/or environment data collected during the same time slice. Individual components may vary in time or distance within a tolerance range and still be grouped in the same feature vector. In one example, feature vectors $X_i$ are defined as [environmental data, map data], in another example defined as [map data, vehicle data], and in a third example as [vehicle data, motion data, map data, and environment data]. Any permutation is possible.

The position circuitry generates data indicative of the location of the vehicle 124 or the mobile device 122 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 122. The positioning system may also include a receiver and correlation chip to obtain a GPS signal.

The position data may be sent to geographic database 123 or a memory local to the mobile device 122 to determine a road link or segment that the vehicle 124 is traveling on. The determination may be made through map matching. The road link may have various properties ("map data"). The properties may include length of the road link, slope of the road link, altitude of the road link, curvature of the road link, lane width, current lane of the road link, sinuosity of the road link, functional class of the road link, speed category of the road link, width of the road link, and context of the road length. The sinuosity is a quantity that describes the overall curviness of the road length. The sinuosity may be defined as the length of the road segment divided by the Euclidian distance between the start and end of the segment.

The context of the road link describes a type of the road link or features of the road link. Example contexts for a road segment may include, ramp on, ramp off, intersection, split Y, merge, high occupancy, express, bus lane, or singular (e.g., normal road or null). The context may be directly correlated to a likelihood that signs for neighboring road links are visible or detectable from the road link. The context describes whether lanes of different speeds are present in the case of high occupancy, express, bus lanes, or other specialized purposes. The context describes whether a ramp, merge, or intersection is associated with the road link.

The speed category of the road link defines the expected minimum and maximum driving speed of the road segment. A number of (e.g., eight) categories of speed category may exist which are represented as numerical values (e.g., 1 through 8) in the feature vectors. Speed category 1 may be segments where drivers can drive the fastest while speed category 8 may have the slowest expected speeds. The width of the road link may be computed as the number of lanes multiplied by a predetermined lane width. The predetermined lane width may be set (e.g., 4 meters) or selected as a function of functional classification.

Table 2 lists example classification systems that may be assigned numeric values for functional class. The functional class of the road segment may be described as a numerical value (e.g., 1, 2, 3, 4, and 5) represented in the feature vector. Functional class 1 may be highways while functional class 5 may be small streets. Table 2 further illustrates schemes having three to six functional classes.

TABLE 2

| Simple System | Complex System | U.S. Long Distance Roads | Highway Tags |
|---|---|---|---|
| Arterial Road | Interstates | Interstate Expressway | Motorway |
| Collector Road | Principal Arteries | Federal Highway | Trunk |

TABLE 2-continued

| Simple System | Complex System | U.S. Long Distance Roads | Highway Tags |
|---|---|---|---|
| Local Road | Minor Arteries Major Collector Minor Collector Local Road | State Highway County Highway Local Road | Primary Secondary Tertiary Residential |

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The IMU generates data indicative of the relative motion of the vehicle 124 or the mobile device 122 ("motion data"). The IMU may include one or any combination of gyroscopes, accelerometers, and magnetic sensors built or embedded into or within the interior of the mobile device 122. The accelerometer is operable to detect, recognize, or measure the rate of change of translational and/or rotational movement of the mobile device 122.

The environment sensors 111 generate data for identifying the surroundings and location of the car ("environment data"). The environment sensors 111 may include light detection and ranging (LIDAR), radar, pressure sensors, rain sensors, windshield wiper sensors, altimeter, barometers, lane sensors, proximity sensors, or other sensors. The mobile device 122 may identify likely weather (e.g. light rain, heavy rain, sun, snow, wind, or other weather features) or environmental conditions based on the data output of the environment sensors 111. Alternatively, the mobile device 122 may receive the environment data from a website or a weather service in response to a request including the location of the mobile device 122.

The environment data may be distilled into weather states such as "SNOW", "NO_CONDITIONS", "FOG", "RAIN", and "RAIN_SNOW". Other weather states are possible. The environment data may be reduced to a numerical rating for the visibility (e.g., 10 for clear days to 1 for very foggy or rainy days). Raw sensor data or other constructions of the data may be used. The environment data may also be organized into a normalized density distribution histogram. The histogram may include bins corresponding to the weather states. In one example, five bins are used. The weather may have a significant effect on the ability of computer vision or other techniques to accurately interpret sign values.

The vehicle sensors 113 generate data based on detecting the operation of the vehicle 124 ("vehicle data"). The vehicle sensors 113 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. In addition, the vehicle sensor 113 may include a steering wheel angle sensor, a speedometer sensor, or a tachometer sensor. Data from these sensors may be quantified for components of the feature vectors $X_i$.

The server 125 analyzes the input space Y (sign placement values) and output space X (feature vectors of characteristics under which the sign placement values were determined) to construct a model. The model may be a machine learning model. Examples include a Bayesian model, a tree based model and an ensemble classifier.

The Bayesian model may be given a set of classification features (feature vector) $F_1$ through $F_n$ and a set of possible outcomes (e.g., sign placement values—$C \in \{RIGHT, LEFT, RIGHT\_LEFT, MIDDLE\_TOP\}$). The algorithm considers the n classification features according to Equation 2.

$$\text{classify}(f_1, \ldots, f_n) = \text{argmax}_c p(C=c) \Pi_{i=1}^n p(F_i=f_i|C=c) \quad \text{Eq. 2}$$

A tree based model may use decision trees. At each node of the tree, the algorithm chooses the attribute of the data that most effectively splits its set of samples into subsets enriched in one class or the other. The splitting criterion may be the normalize information gain (difference in entropy). The attribute with the highest normalized information gain is chosen to make the decision. The algorithm then recurs on the smaller sublists.

An ensemble classifier, such as a random forest, may comprise multiple decision trees. One example uses 10 decision trees but any number may be used. For each decision tree, a randomly selected subset of the features is used to build the tree. Finally, each of the multiple trees vote towards the predicted label output for the sign placement values (e.g., $C \in \{RIGHT, LEFT, RIGHT\_LEFT, MIDDLE\_TOP\}$). For the final predicted label, the model selects the output with the one with the most votes.

Any of the models may also output a confidence level associated with the sign placement values. The confidence level may be a value from the model that indicates the likelihood that the model has definitively determined where the sign should be placed for this road link and other conditions. In one example of the random forest classifier, the confidence level may be calculated from a quantity of the decision trees that agree. In other words, if 7 of the 10 random trees select left side placement for the sign, the server 125 calculates a confidence level of 0.7. The confidence value may be a percentage or a value from 0 to 1 in 0.1 increments. Other techniques for the confidence level may be used.

After the model is constructed, the model is used to make predictions of sign placement based on subsequently collected data under one or more of the characteristics described above. The server 125 may execute the model based on data received from the mobile device 122 or the model may be directly executed by the mobile device 122. These applications are discussed in more detail below.

Figure 9:
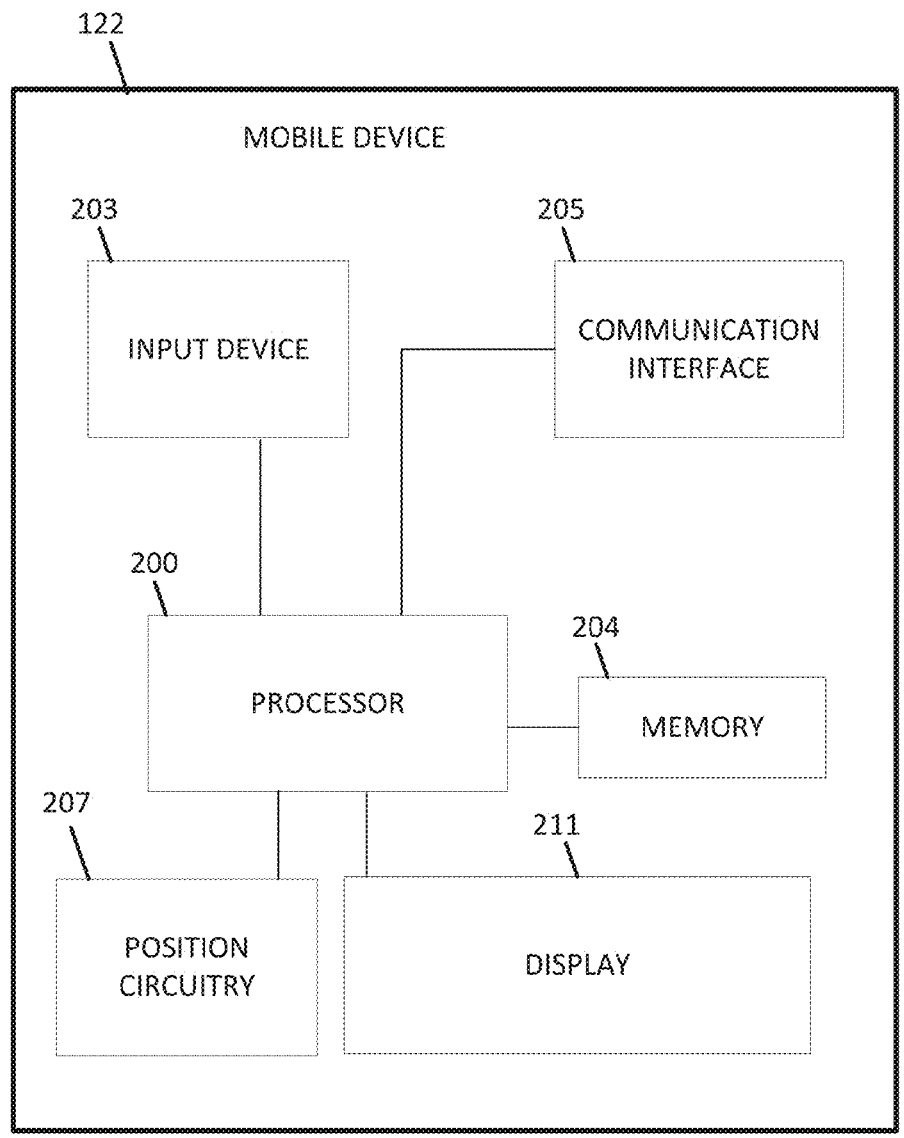
FIG. 9 illustrates an example mobile device of the system of FIG. 1.
Figure 10:
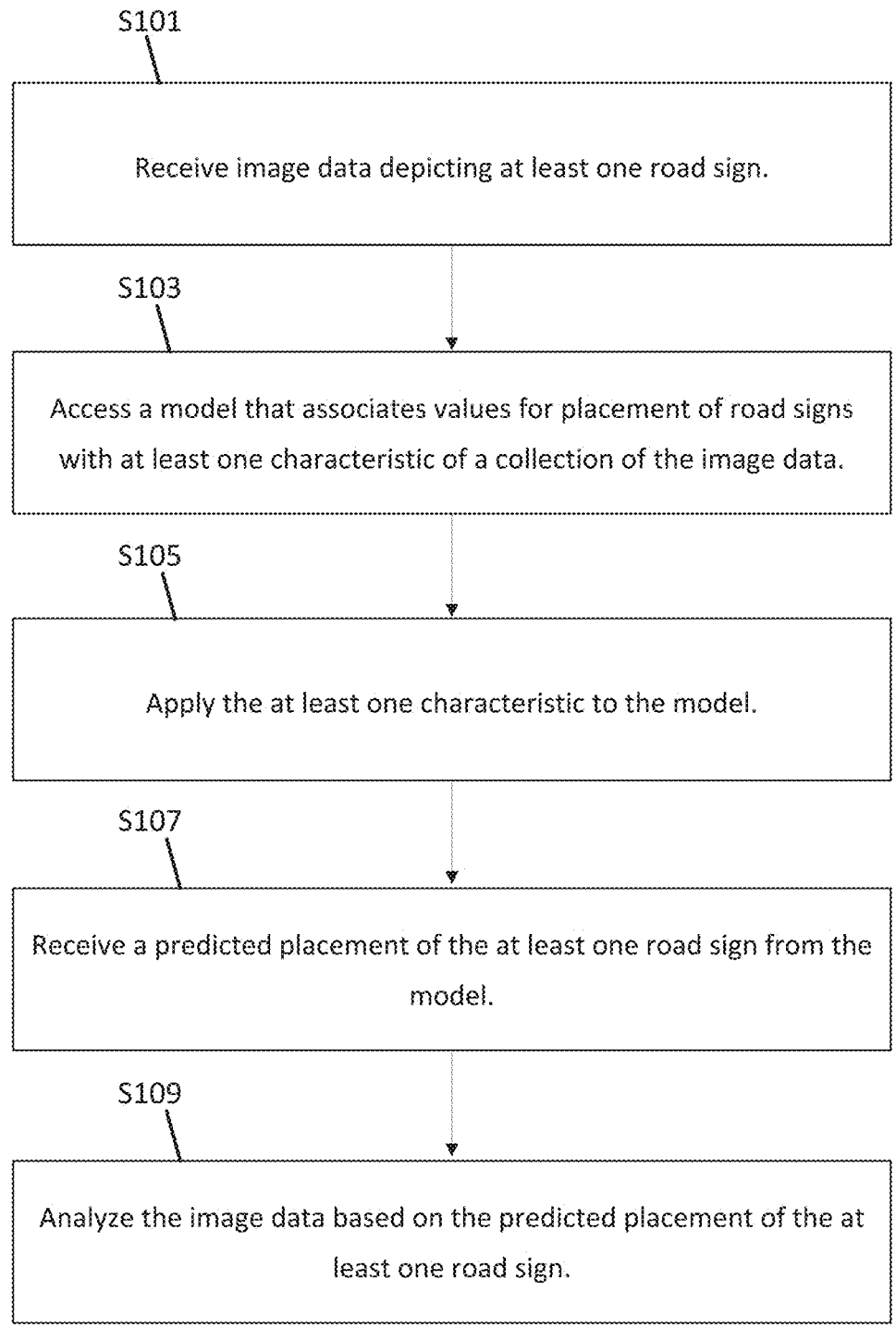
FIG. 10 illustrates an example flowchart for determining lateral sign placement.

FIG. 9 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device/personal computer 122. FIG. 10 illustrates an example flowchart for determining lateral sign placement. The acts may be applied in a different order. Acts may be omitted or repeated. Additional acts may be added. The memory 204 may store the model previously generated under training examples of sign placements and characteristics under which the sign placements were determined.

At act S201, the processor 200 or the communication interface 205 may be configured to receive data (e.g., image data) including a road sign collected under a subsequent characteristic or real time characteristic after the model above has been generated. The data may be collected by a camera 115 or other collection device mounted on the vehicle or integrated with the mobile device 112. The subsequent characteristic may be any one or combination of the of vehicle data, position data, motion data, map data, and environment data as described above. The subsequent characteristic may be packaged as a feature vector.

At act S203, the processor 200 access the machine learned model from memory 204. The model may have been previously constructed as described above. The model associates values for placement of road signs with at least one characteristic of a collection of the image data.

At act S205, the processor 200 applies the subsequent characteristic or real time characteristic to the model as a feature vector. At act S207, the model returns a predicted placement of the at least one road sign. The predicted placement may be right side, left side, top, or other examples described above.

At act S209, the processor 200 analyzes the data based on the predicted placement of the at least one road sign. The predicted placement may impact the order of analysis of the newly collected data, the predicted placement may provide a confirmation to the detected placement of the sign, or the predicted placement may impact the assignment of a detected placement to a current road link.

In some examples, the data is analyzed to prioritize analysis according to the predicted placement. For example, computer vision techniques may be applied initially to the predicted placement area of the data and later to other portions of the data. In another example, computer vision techniques may be applied only to the predicted placement area of the data. The processor 200 may configure and/or apply the computer vision technique as a function of the predicted placement.

In some examples, the predicted placement is compared to a detected placement. For example, the processor 200 analyzes data including a road sign collected under a subsequent characteristic or real time characteristic using a computer vision technique to determine a detected placement of the road sign. Independently, the processor 200 applies the subsequent characteristic or real time characteristic to the model to obtain a predicted placement. The processor 200 compares a detected placement to the predicted placement.

When the detected placement and predicted placement match within a degree of error, the processor 200 continues to analyze the detected placement of the road sign using computer vision techniques in order to identify a value of the road sign. The value of the road sign may be the posted speed limit, a destination name, a road name, or any of the other examples described herein. The degree of error may be a predetermined angle from the point of collected, a Euclidean distance, or a pixel distance between the predicted placement and the detected placement. The degree of error may be a difference in numerical values assigned to the placement, as shown in Table 1.

When the detected placement and the predicted placement mismatch within a degree of error (or do not match with the degree of error), the processor 200 may modify the detected placement. For example, the detected placement may be dismissed as an error. In another example, a more rigorous or computer resource intensive computer vision technique may be applied to the data including the road sign to better determine whether or not a road sign is described at the detected placement.

In another example, the processor 200 may determine whether the road sign should be associated with the current road link. As described in several examples above, road links may be detectable from a current road link but intended for an adjacent road link. The processor 200 may be configured to identify a road link associated with the collection of the image data based on location data from the position circuitry 207. When the predicted placement does not match the detected placement, this is an indication that the road sign in the data belongs to an adjacent road link. Thus, the processor 200 may assign values from the at least one road sign in the image data when the detected placement matches the predicted placement. When the detected placement and the predicted placement do not match, the processor 200 may assign the values to an adjacent link or an adjacent lane. The adjacent link or adjacent lane may be selected based on the position of the detected position. In another example, the processor 200 may identify a group of possible road links in proximity to the road sign of the subsequent image, and determine a selected road link from the plurality of road links based on the predicted placement and/or the detected placement. Alternatively, when the detected placement and the predicted placement do not match, the processor 200 may delete the detected position and make no associated with a road link.

The vehicles 124 may be autonomous vehicles. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

Autonomous vehicles or HAD vehicles may be used to collect the data for building the models. In addition, autonomous or HAD vehicles may be controlled based on detected signs and the model. For example, the autonomous or HAD vehicle may collect images of road signs and analyze the road signs on the fly. The analysis may be based on the embodiments herein. The autonomous or HAD may change the speed of the vehicle, make turns, select a new route, or other driving features based on the analysis.

Figure 11:
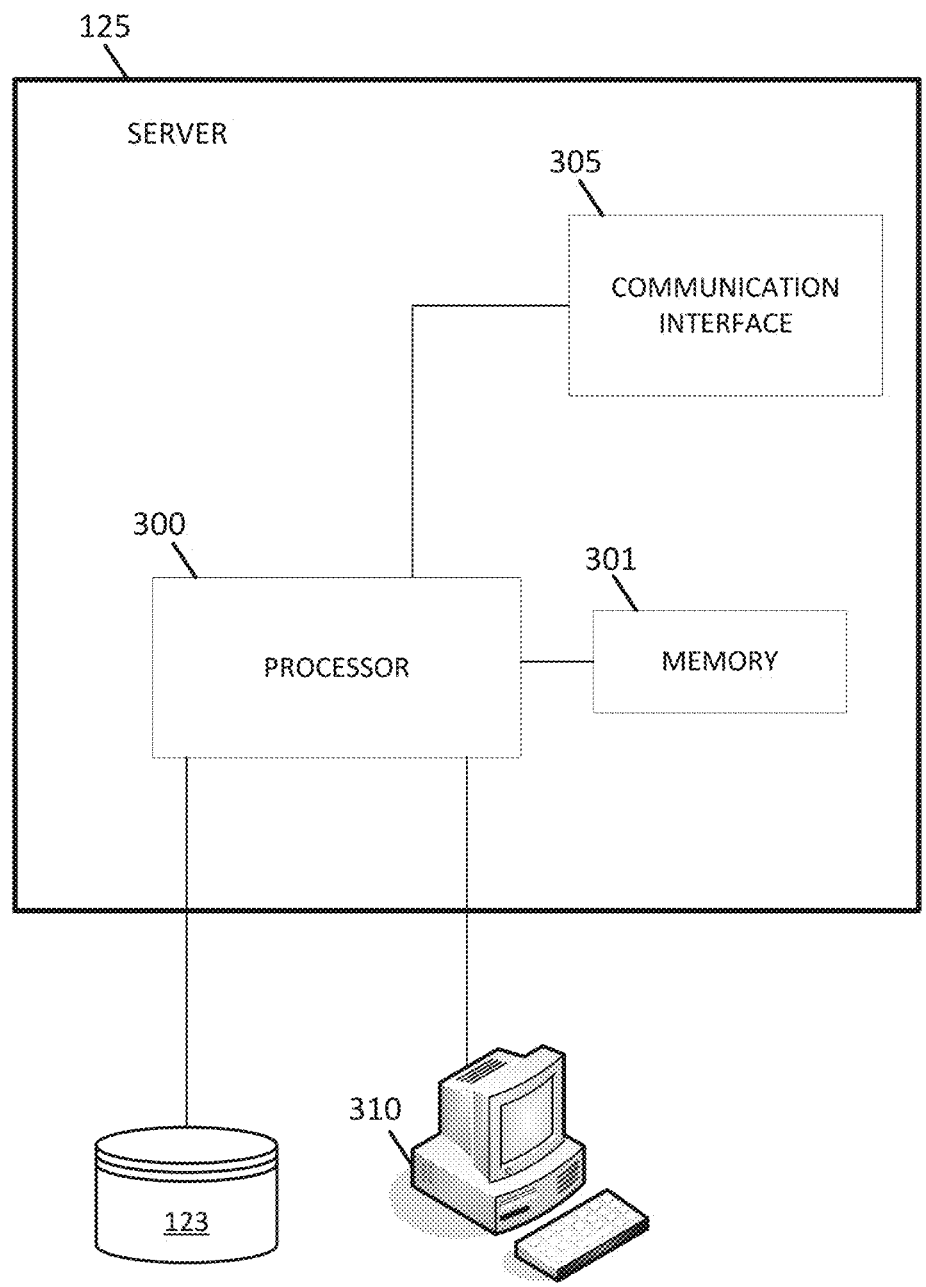
FIG. 11 illustrates an example network device of the system of FIG. 1.
Figure 12:
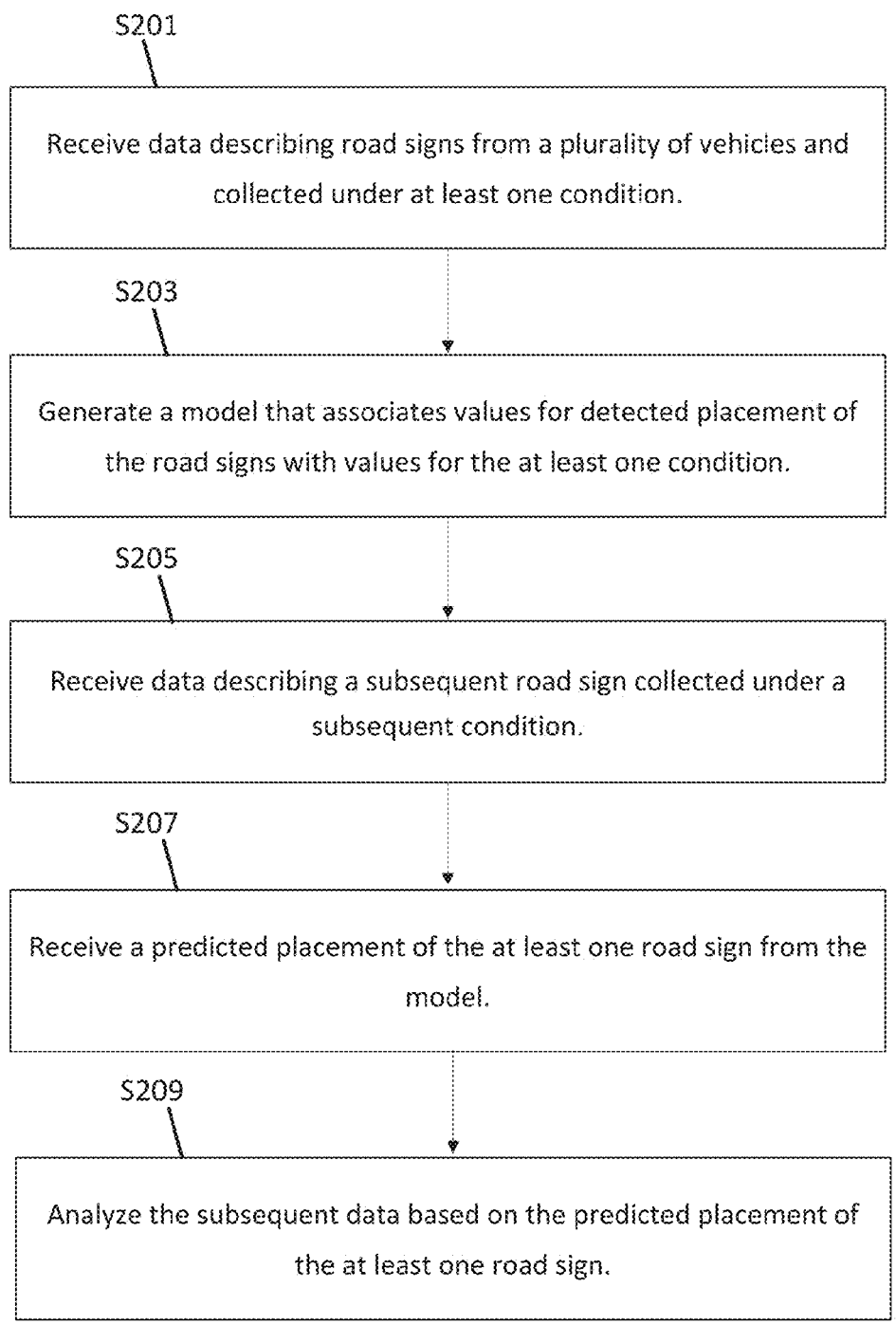
FIG. 12 illustrates an example flowchart for determining lateral sign placement.

FIG. 11 illustrates an example network device (e.g., server 125) of the system of FIG. 1. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of user inputs made via the workstation 128 or the mobile device 122. FIG. 12 illustrates an example flowchart for determining lateral sign placement. The acts of the flowchart of FIG. 12 may alternatively be performed by the server 125, an advanced driving assistance system (ADAS), a HAD device or an autonomous vehicle, any of which may be referred to as a computing device. Different, fewer, or additional acts may be included.

At act S201, the processor 300 or communication interface 305 receives data collected under one or more conditions and describing at least one road sign through a network 127. The data may be collected by a camera, LIDAR device, or radar device traveling on a road link, which may be carried by a person or a vehicle. At act S203, the processor 300 generates a historical learned model that associated values for the detected placement of the road sign to values for the one or more conditions that the data was collected. The conditions may be any of the characteristics above include vehicle data, road data, environment data or others. The conditions may describe the road link on which the data was collected. The conditions may indicate whether the road link is a ramp, an access road, a particular lane, or an express lane. The conditions may indicate a functional classification of the road link, a curvature of the road link, or a relative elevation factor of the road link. The relative elevation factor describes a measure of the rate in change of elevation of the road link (e.g., how hilly the road link is).

At act S205, the processor 300 or communication interface 305 receives subsequent data describing a subsequent road sign. The subsequent data is collected under one or more subsequent conditions. The subsequent conditions may be any of the characteristics above include vehicle data, road data, environment data or others.

At act S207, the processor 300 accesses the model generated at act S203 that associates values for placement of road signs with one or more conditions, applies the one or more conditions to the model, and receives a predicted placement of the at least one road sign from the model. At act S209, the processor 300 analyzes the data based on the predicted placement of the at least one road sign. The predicted placement may be used to prioritize how an image analysis technique is applied to the data describing the road sign. The predicted placement may be used to determine whether or not to assign a road link from which the data describing the road sign was collected to values includes on the road sign in the database 123.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The mobile device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving image data depicting road signs from a plurality of vehicles;
    analyzing, by a processor, a detected lateral placement of the road signs and at least one characteristic of a collection of the image data;
    generating, by the processor, a model that associates values for the lateral placement of the road signs with values for the at least one characteristic;
    receiving a subsequent image including a road sign collected under a subsequent characteristic;
    identifying a plurality of road links in proximity to the road sign of the subsequent image; and
    determining, based on the model that associates values for the lateral placement of the road signs with values for the at least one characteristic, a selected road link from the plurality of road links based on a subsequent detected placement of the road sign and the subsequent characteristic.

2. The method of claim 1, further comprising:
    accessing the model that associates values for the lateral placement of the road signs with values for the at least one characteristic;
    applying the subsequent characteristic to the model; and
    receiving a predicted placement of the road sign from the model.

3. The method of claim 2, further comprising:
    comparing the subsequent detected placement to the predicted placement.

4. The method of claim 3, further comprising:
    modifying the subsequent detected placement when the subsequent detected placement and the predicted placement are mismatched.

5. The method of claim 3, further comprising:
    identifying values from the road sign in the subsequent image when the subsequent detected placement matches the predicted placement.

6. The method of claim 1, wherein the at least one characteristic includes one or more of characteristics of a road link from which the image data depicting road signs is collected.

7. The method of claim 1, wherein the one or more characteristics of the road link includes whether a ramp, merge, specialized lane, or intersection is associated with the road link.

8. The method of claim 1, wherein the at least one characteristic includes environment conditions.

9. The method of claim 1, wherein the values for the detected lateral placement of the road signs include angle ranges, angles, or predetermined lateral placement positions.

10. The method of claim 9, wherein the predetermined lateral placement positions include any combination of overhead, right, and left.

11. The method of claim 1, wherein the model includes a machine learned model.

12. An apparatus comprising:
    at least one processor; and
    at least one memory including computer program code for one or more programs; the at least one memory and the computer program code configured to, with the at least one processor, cause the apparatus to at least:
    receive data describing road signs from a plurality of vehicles;
    analyze a detected placement of the road signs with respect to a road, and at least one characteristic of a collection of the data;
    generate a model that associates values for the detected placement of the road signs with values for the at least one characteristic;
    receive a subsequent image including a road sign;
    identify a plurality of road links in proximity to the road sign of the subsequent image; and
    determine a selected road link from the plurality of road links based on the model.

13. The apparatus of claim 12, wherein the at least one characteristic includes one or more of properties of a road link from which the data describing road signs is collected or includes one or more environment conditions under which the data describing road signs was collected.

14. A method comprising:
receiving data describing at least one road sign;
accessing, by a processor, a historical learned model that associates values for placement of road signs with at least one characteristic of a collection of the data;
applying, by the processor, the at least one characteristic to the historical learned model;
receiving a predicted placement of the at least one road sign from the historical learned model;
analyzing, by the processor, the data based on the predicted placement of the at least one road sign;
identifying a road link associated with the collection of the data; and
assigning, to the road link, at least one value from the at least one road sign in the data when the detected placement matches the predicted placement.

15. The method of claim 14, wherein analyzing the data comprises:
identifying a detected placement of the at least one road sign in the data; and
comparing the detected placement to the predicted placement.

16. The method of claim 15, further comprising:
modifying the detected placement when the detected placement and the predicted placement are mismatched.

17. The method of claim 15, further comprising:
identifying values from the at least one road sign in the data when the detected placement matches the predicted placement.

18. An apparatus comprising:
at least one processor; and
at least one memory including computer program code for one or more programs; the at least one memory and the computer program code configured to, with the at least one processor, cause the apparatus to at least:
receive data describing at least one road sign including a detected placement;
access a historical learned model that associates values for lateral placement of road signs with at least one characteristic of a collection of the data;
apply the at least one characteristic to the historical learned model;
receive a predicted lateral placement of the at least one road sign from the historical learned model;
analyze the data based on the lateral predicted placement of the at least one road sign;
identify a road link associated with the collection of the data; and
assign, to the road link, at least one value from the at least one road sign in the data when the detected placement matches the lateral predicted placement.

* * * * *